United States Patent
Greaves et al.

(10) Patent No.: US 7,979,521 B2
(45) Date of Patent: Jul. 12, 2011

(54) METHOD AND SYSTEM FOR RELOCATING AND USING ENTERPRISE MANAGEMENT TOOLS IN A SERVICE PROVIDER MODEL

(75) Inventors: Jon D. Greaves, Aldie, VA (US); Michael D. Seminaro, New York, NY (US)

(73) Assignee: Oracle America, Inc., Redwood City, CA (US)

( * ) Notice: Subject to any disclaimer, the term of this patent is extended or adjusted under 35 U.S.C. 154(b) by 1087 days.

(21) Appl. No.: 11/151,645

(22) Filed: Jun. 14, 2005

(65) Prior Publication Data

US 2006/0015613 A1 Jan. 19, 2006

Related U.S. Application Data

(63) Continuation-in-part of application No. 10/452,933, filed on Jun. 3, 2003, now abandoned.

(60) Provisional application No. 60/384,392, filed on Jun. 3, 2002.

(51) Int. Cl.
*G06F 15/173* (2006.01)

(52) U.S. Cl. ........ 709/223; 709/225; 709/227; 709/229; 709/224; 370/356; 370/473

(58) Field of Classification Search ........... 709/223–224
See application file for complete search history.

(56) References Cited

U.S. PATENT DOCUMENTS

| | | | | |
|---|---|---|---|---|
| 6,128,644 A * | 10/2000 | Nozaki | ........................ | 709/203 |
| 6,292,838 B1 | 9/2001 | Nelson | | |
| 6,314,111 B1 * | 11/2001 | Nandikonda et al. | ......... | 370/473 |
| 6,324,582 B1 * | 11/2001 | Sridhar et al. | ................ | 709/230 |
| 6,393,467 B1 * | 5/2002 | Potvin | ........................... | 709/217 |
| 6,397,359 B1 | 5/2002 | Chandra et al. | | |
| 6,404,743 B1 | 6/2002 | Mendzija | | |
| 6,848,007 B1 * | 1/2005 | Reynolds et al. | ............. | 709/245 |
| 7,051,116 B1 * | 5/2006 | Rodriguez-Val et al. | ..... | 709/245 |
| 7,127,743 B1 * | 10/2006 | Khanolkar et al. | ............. | 726/23 |
| 7,140,025 B1 * | 11/2006 | Dillow et al. | ................. | 719/313 |
| 7,209,484 B2 * | 4/2007 | Ohno et al. | .................... | 370/401 |
| 7,373,399 B2 * | 5/2008 | Steele et al. | .................. | 709/223 |
| 2002/0133582 A1 * | 9/2002 | Shibata | ........................ | 709/223 |
| 2002/0178353 A1 * | 11/2002 | Graham | ....................... | 713/151 |

OTHER PUBLICATIONS

Shinichi Matsumoto and Makoto Amamiya, "Network Management with Intelligent Trader", Oct. 2000, IEEE Computer Society, 24th Interfactional Computer Software Application Conference, all pages.*
D. New and M. Rose, "RFC3195—Reliable Delivery for syslog", Nov. 2001, Network Working Group, RFC 3195, all pages.*
Takeshi Imamura and Hiroshi Maruyama, "Mapping between ASN.1 and XML", Jan. 2001, IEEE, Proceedings of the 2001 Symposium on Applications and the Internet, all pages.*
International Search Report for PCT/US03/17264 mailed Oct. 23, 2003.

* cited by examiner

*Primary Examiner* — Kevin Bates
*Assistant Examiner* — Hua Fan
(74) *Attorney, Agent, or Firm* — Marsh Fischmann & Breyfogle LLP; Jonathon A. Szumny; Kent A. Lembke

(57) ABSTRACT

An embodiment of the invention provides a method for communicating event data in a network, including: receiving the event data in a first device, the event data including a native IP address associated with a source of the event data; translating a native protocol of the event data into XML, a resulting XML message including the event data and an identifier associated with the first device; transmitting the XML message from a first location to a second location; determining a new IP address based on the native IP address and the identifier; and including the new IP address in the XML message.

19 Claims, 11 Drawing Sheets

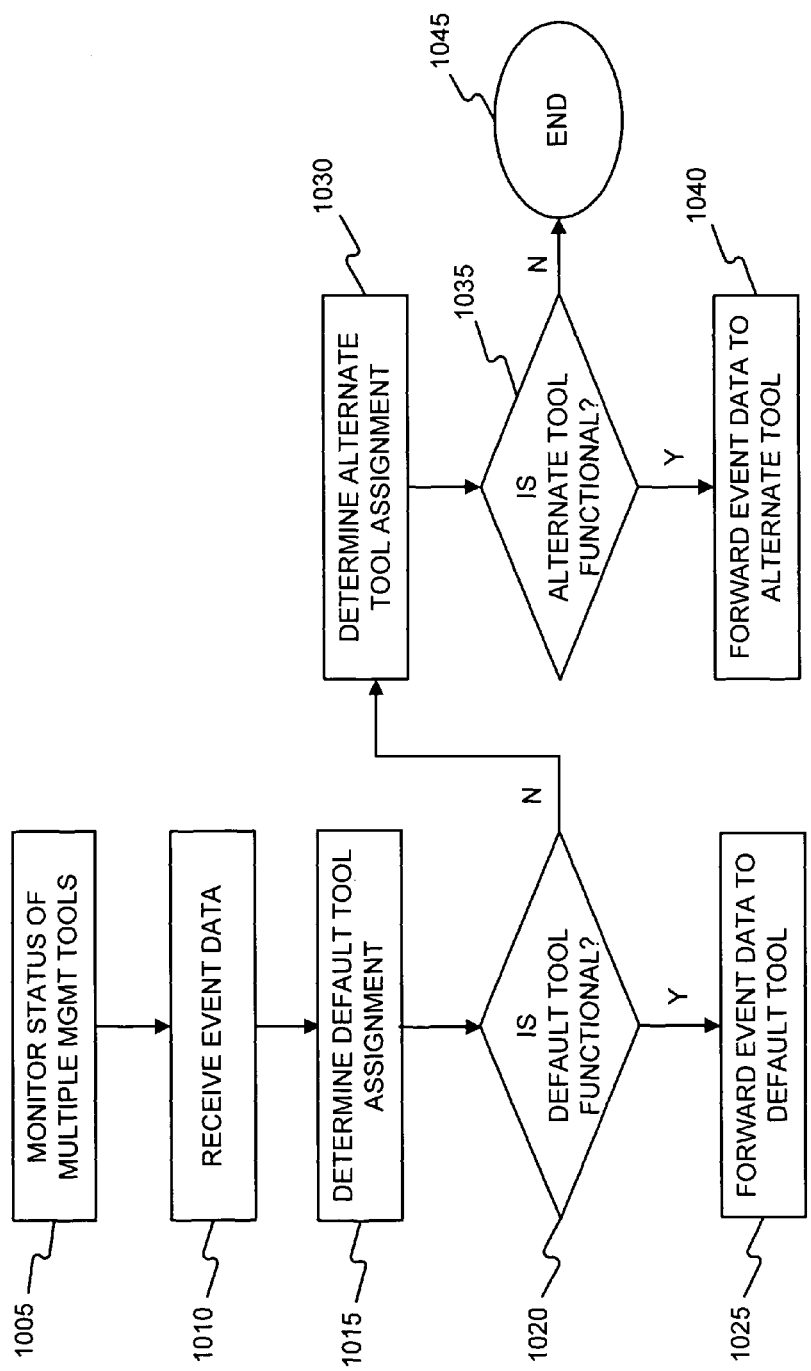

METHOD AND SYSTEM FOR RELOCATING AND USING ENTERPRISE MANAGEMENT TOOLS IN A SERVICE PROVIDER MODEL

CROSS-REFERENCE TO RELATED APPLICATIONS

The present application is a Continuation-in-Part (CIP) of U.S. patent application Ser. No. 10/452,933, filed Jun. 3, 2003, now abandoned which claims priority under 35 U.S.C. §119(e) to U.S. Provisional Patent Application No. 60/384,392, filed Jun. 3, 2002. U.S. patent application Ser. Nos. 10/452,933 and 60/384,392 are hereby incorporated by reference in their entirety. Two non-provisional U.S. patent applications, entitled "Method and System For Remote Management of Customer Servers," U.S. application Ser. No. 11/151,646, and "Method and System for Filtering and Suppression of Telemetry Data," U.S. application Ser. No. 11/151,665, filed concurrently herewith, are hereby incorporated by reference in their entirety.

FIELD OF THE INVENTION

The present invention relates to the monitoring and management of devices or appliances using a network management system and the like.

BACKGROUND OF THE INVENTION

Network management tools analyze event data generated by autonomous software agents or otherwise originating from devices on a managed network. Known schemes for using such network management tools have many disadvantages, however. For example, many developers of network management tools only contemplate use within a single local enterprise; as a result, known network management tools cannot accommodate overlapping IP addresses that may occur if the data being collected originates from two or more local networks.

In addition, network management tools are sometimes located within network management systems that are remote from the managed network. But, because such remote network management systems typically require reliable data transport between the managed network and the management tools, it may not be feasible to use an Internet connection for such data transport.

The above shortcomings constrain the ability of a service provider to leverage one or more network management tools across multiple managed (customer) networks. Moreover, existing network management systems and methods do not effectively utilize multiple managements tools, as might be required, for example, in a multi-subscriber environment, or for improving the fault tolerance of a network management system.

SUMMARY OF THE INVENTION

Embodiments of the invention are directed generally to improved systems and methods for collecting device event data in a managed network, and forwarding such event data to one or more management tools in a network management system. As used herein, references to event data are also applicable to event data streams.

An embodiment of the invention provides a method for communicating event data in a network, including: receiving the event data in a first device, the event data including a native IP address associated with a source of the event data; translating a native protocol of the event data into XML, a resulting XML message including the event data and an identifier associated with the first device; transmitting the XML message from a first location to a second location; determining a new IP address based on the native IP address and the identifier; and including the new IP address in the XML message.

Another embodiment consistent with aspects of the invention provides a computer-readable medium, the computer-readable medium having instructions stored thereon for performing a method, the method including: receiving event data in a server, the event data including an appliance identifier and a native IP address; determining a new IP address, based on the appliance identifier and the native IP address; and altering the event data to reflect the new IP address such as by substituting the new IP address for the native IP address in the event data.

Another embodiment consistent with aspects of the invention provides a system for communicating event data in a network, including: a network management system; a management server coupled to the management system, the management server including an address translation module, configured to translate a native IP address of the event data into a new IP address at the application layer; and at least one customer appliance coupled to the management server, and configured to receive the event data from at least one managed device.

A further embodiment consistent with aspects of the invention provides a method for communicating event data in a network, including: determining a status for each of a plurality of management tools, the status being one of functional and non-functional; receiving event data from a managed network; and selecting a management tool from a plurality of management tools based on a predetermined assignment; and if the status of the selected management tool is functional, forwarding the event data to the default management tool.

Advantageously, embodiments of the invention may accommodate the overlapping IP address problem associated with managing multiple customer networks. In addition, embodiments of the invention may facilitate the use of an unreliable link, such as the Internet, between one or more managed networks and a network management system. Embodiments of the invention may also facilitate multi-subscriber environments, load balancing schemes, and improved fault tolerance where more than one management tool is used in a network management system.

Additional features of the invention will be set forth in part in the description which follows, and in part will be obvious from the description, or may be learned by practice of the invention. These features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIG. 10 is a flow diagram of a process for communicating event data in a network, according to an embodiment of the invention.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
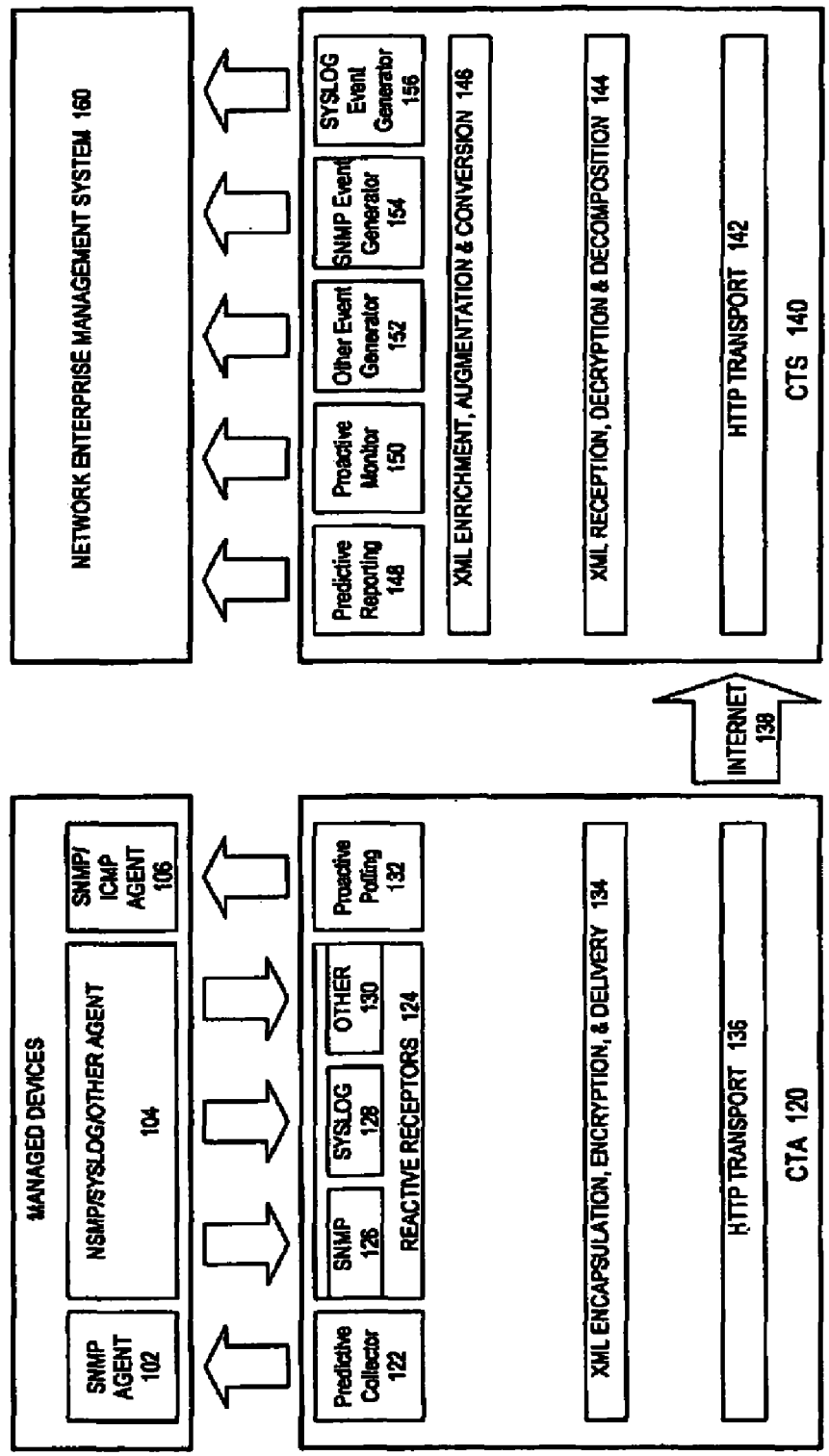
FIG. 1 illustrates the information flow and components in one embodiment of the present invention.

FIG. 1 shows an information flow in accordance with some illustrative embodiments of the present invention. The event delivery system 100 in accordance with embodiments of the present invention may include two main components. First is a client receiver platform 120 (hereafter "control tower appliance" 120 or "CTA" 120) which is preferably a rack mountable platform deployed in a client cage which provides store and forward of event information and a secure management jump gate to reach client hosts. The CTA 120 may be deployed in one-to-one, one-to-many, or many-to-one configurations depending on customers/partners environment. Second is an event delivery server 140 (hereafter a "control tower server" 140 or "CTS" 140) which provides a unified and/or centralized event delivery mechanism for all CTAs and other future service platforms. The CTS 140 provides an extensible open standard based delivery platform of event information into core systems. A single CTS, such as CTS 140, will preferably support many customers and is easy to scale with additional computing resources. In general, information about events to be monitored or managed flows from information source(s) (hereafter "agents") to a CTA 120 and then to a CTS 140, from which the information is then passed to appropriate network management tools.

In some embodiments, applications will include those developed in Java. Java provides cross platform support and access to many libraries that already support various protocols used by event delivery system 100. This approach also provides a high degree of software re-use and the possibility of creating new products such as monitoring solutions requiring zero in cage hardware footprint.

CTA 120 and CTS 140 may use extended markup language (XML) to share data and configuration information between various components. XML has many advantages over other formats including its ability to be extended without reengineering applications. The event delivery system 100 may define an XML schema to describe event information. This schema allows any application that supports HTTP and XML to deliver events into particular systems (e.g., into SevenSpace systems in some embodiments).

As shown in FIG. 1, the event delivery system 100 includes the CTA 120 that receives reactive, proactive and/or predictive event information from at least one of managed device agents 102, 104, and 106. The CTA 120 preferably includes several lightweight software components. While these components are preferably targeted to be executed on the CTA platform, they could easily be executed on customer or partner hosts or the like to provide zero or substantially zero hardware footprint monitoring in cases where the customer only requires monitoring, or monitoring and reporting, on servers.

Devices produce reactive event information, for example, when they encounter an error or reporting condition. Reactive events are typically delivered in Simple Network Management Protocol (SNMP), System Log (Syslog) or other suitable formats. SNMP/Syslog formats may be considered unreliable due to their delivery being over the User Datagram Protocol/Internet Protocol (UDP/IP) protocol. Proactive events, for example, can be produced by an external entity (such as a CTA) polling the device to check its health. Predictive events, for example, can be produced by an external entity (again, such as a CTA) polling the device to collect performance metrics of the target device. Reactive, proactive and predictive events are collected by the client application using appropriate native protocols, such as SNMP trap, SNMP, Syslog, Remote Monitoring (RMON); Internet Control Message Protocol (ICMP) Ping and/or the like.

The CTA 120 includes reactive event receptors 124, which collect asynchronous events from monitored devices. Preferably, specific receptors may be developed to support the core monitoring technologies deployed. These may include a SNMP receptor 126 and an Syslog receptor 128. Using this model, the CTA 120 can be easily extended to support other future monitoring technologies, accommodated in a receptor 124. Events reported from agents 102, 104 and/or 106 are delivered over User Datagram Protocol (UDP) transport. UDP does not make provision for the sender to attempt retransmission should the receptor be blocked and is not able to process the inbound event. To minimize the risk of losing events, each receptor's function will be limited to receiving the event and queuing in the native format for additional processing.

The function of a predictive collector 122 is to perform SNMP polling operations to collect the appropriate values that are queued for delivery. Preferably, a CTS deferred reporting engine 154 breaks these requests back into the appropriate format for queuing in a data warehouse, which is included within enterprise network management system 160. In preferred embodiments, performing in this manner allows CT to preserve a near real time reporting capability.

A proactive polling module 132 provides a heartbeat module that delivers predictive monitoring. A heartbeat helps identify a properly functioning system from a disabled system. For example, if the receptors are not receiving events from a customer device, one of the following scenarios is true: the device is healthy and is not attempting to send events; or the device is hard down and not capable of generating events. Proactive polling element 132 provides an extra level of confidence that customer hosts are alive by performing SNMP "pings" of agents ensuring that, e.g., both the TCP/IP stack and agents are alive. The heartbeat will send the results of the "ping" to CTS 140 via an event delivery process. This information can be used to present up/down information on monitored systems and also validated by a CTS proactive monitor 150 to ensure the CTA 120 has checked in within an appropriate window and all monitored servers are well.

With the successful reception of event data from the managed devices by the CTA 120, an extensible mark-up language (XML) encapsulation, encryption and delivery module 134 begins a delivery phase to transport the data to a set of data monitoring and management tools. Each type of event received is encapsulated, for example, in the form of an XML message using predefined XML schemas. The XML message is encrypted, preferably using a common encryption protocol, for example, Twofish, Blowfish, Data Encryption Standard (DES), Advanced Encryption Standard (AES), or the like. Encrypted XML messages are delivered via Hyper Text Transfer Protocol (HTTP) protocol between CTA 120 and CTS 140. Should the connection between the CTA 120 and CTS 140 be unavailable, or the connection quality be deemed unsuitable for transport, the CTA 120 may look for alternative CTS servers located in diverse locations. If these are not available, the CTA 120 may act in a store and forward mode until such time that the connection is of sufficient quality to deliver event information.

An HTTP transport module 136 is responsible for the actual delivery of events from CTA 120 to CTS 140. It operates on the push paradigm and only requires an outbound channel from the customer's network to CTS 140 to operate. Events are encapsulated in either HTTP or HTTPS protocol for delivery. Confidentiality of the event traffic leaving the CTA 120 may be maintained by having the XML message encrypted before transmission. Thus, the system can achieve benefits of HTTPS without the overheads associated with that protocol. Using this mode of operation, the CTA 120 can sustain, in some embodiments, hundreds of events per second. Additionally, the HTTP protocol is also customer friendly in that most customers already permit outbound HTTP connections through their firewalls.

Data from the CTA 120 is passed via an Internet transport 138 to the CTS 140. (The data path between the CTA 120 and the CTS 140 is further depicted in FIG. 6.) Referring still to FIG. 1, while the CTS 140 may be designed to support the CTA 120 information, its open nature facilitates simple integration with future monitoring technologies. These include, for example, new agents and data collection products. The CTS 140 may also be deployed in multiple locations to provide geographic failover or event routing or the like.

An HTTP transport module 142 in the CTS 140 performs the actual receiving of events from the CTA 120 to the CTS 140. Data is passed from HTTP transport module 142 to an XML reception, decryption, and decomposition module 144 for further processing with the CTS 140.

The XML reception, decryption, and decomposition module 144 provides a reception and decomposition layer to ensure the successful delivery and acknowledgement of information from the CTA 120. Prior to an acknowledgement being issued, the information is checked for errors in data transmission using an md5 checksum or other method of checksum. Should the event fail its consistency check, the CTS 140 will preferably issue a failure status causing the event to be re-queued by the CTA 120 for retry delivery. As the CTS 140 receives each message, an acknowledgement is provided to the client instructing it that the message was both received and undamaged in transport. At this point, the client is permitted to remove the message from its outbound queue.

An event conversion, augmentation, enrichment module 146 may include some or all of the following features. Preferably, events are received by the server (CTS) application delivered over the HTTP protocol. The integrity and confidentially of these events are validated by the CTS application in module 146. Confirmation of successful reception is provided to the CTA application. CTS application decrypts event message to its XML message format. The XML message is augmented and enriched with additional contextual information. Preferably, conversion of any values such as IP addresses or host name references is performed by an XSL translation.

The proactive monitor 150 provides both a remote health check of all CTA/monitored devices and the simple up/down state of the device (e.g., shown by, for example, Spyglass or other proprietary applications that allow a client to view information stored in the CTA). In this regard, the heartbeat monitor preferably interfaces both with a client viewing application (e.g., Spyglass) and an object server. An object server provides a database that holds information to be presented to operators of the enterprise monitoring system tools so that new events can be identified and acted upon as they arrive. Preferably, should the heartbeat monitor detect a CTA that has not checked in within a pre-determined time or a customer's device that also has not checked in, an event can be generated to create an alert (e.g., to alert an operations center of the outage).

The enriched XML message is converted to its original native format (typically, SNMP trap, Syslog or another format) before being presented to tools supporting these native protocols (e.g., enterprise monitoring system) for presentation to analysts for evaluation. A predictive reporting module 148 inserts reporting data captured by the CTA 120 into a system (e.g., SevenSpace Inc.) data warehouse where it is available for reporting and trending.

When the originating device delivers events via SNMP to the CTA 120, it is necessary to enrich these events before presenting to the operations center. In this mode of operation, an SNMP event generator 154 reconstitutes the SNMP as an SNMP trap which looks identical to the event arriving at CTA 120 with any changes made during transformation. The event generator 154 preferably sends to a local probe within enterprise network management system 160 that contains rules to set severity and augment with any local inventory information. Preferably, address translation is performed at this point to cover customers who may have overlapping address spaces.

Per a similar model as the SNMP event generator 154, raw Syslog information is often too generic to be presented to a GMOC engineer for evaluation. In a Syslog event generator 156, the event may be reconstituted as a Syslog message and delivered to the local Syslog probe for evaluation against the Syslog rule set. Preferably, address translation is performed at this point to cover customers who may have overlapping address spaces. A similar process is also used for an other events generator 152.

Using the CTA 120 and CTS 140, event data is successfully and securely transferred from the managed devices to the enterprise network management system 160. The enterprise network management system 160 comprises a variety of data management tools known in the art to monitor, manage and report event data.

In preferred embodiments, the CTA 120 includes a rack mountable server with minimal CPU, memory and/or disk requirements and that allows a variety of vendors to be considered. In some embodiments, the operating system can be, e.g., a custom Linux Release to Manufacturing® distribution built to support specific CTA functions with all redundant applications stripped away. This distribution can be, e.g., heavily fortified with security features such as, e.g., Linux IPCHAINS stateful inspection firewall, Secure Shell (SSH), Tripwire and/or appropriate file system permissions to lock down the functions further. In addition, a journaling file system is preferably selected which may improve both performance and reliability of the platform.

CTS 140 provides a highly scalable platform to support event delivery and/or preferred polling support. A variety of server platforms may be used for CTS 140. In some embodiments, e.g., Sun Solaris based servers can be used to support the CTS 140 platform. These servers can run, e.g., Apache® web server with java servlet support.

Figure 2:
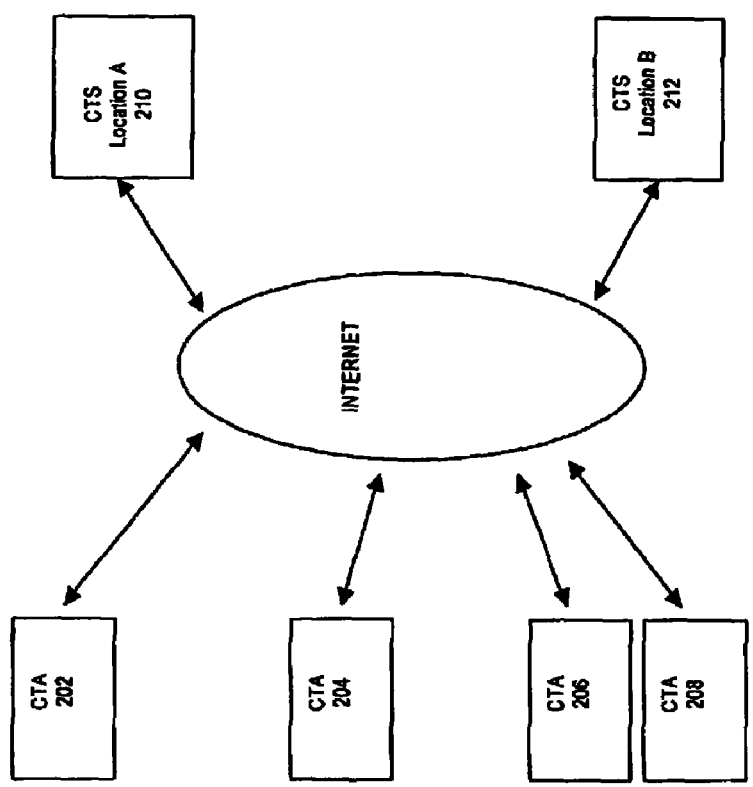
FIG. 2 depicts a shared redundant platform in accordance with some illustrative embodiments.

FIG. 2 provides an illustration of a how the present invention can be configured with a shared redundant platform. Data from managed devices collected at CTA's 202, 204, 206, and 208 is passed via the Internet to one of two CTS locations 210 and 212. In this configuration, the CTS is deployed in multiple locations to provide geographic failover or event routing. For example, the system may be configured with a default that sends data from CTA 202 to CTS location 210. If the connection to CTS location 210 is interrupted or if CTS location 210 is otherwise inoperable, data from CTA 202 can alternatively be sent to CTS location 212. As another example, the system may be configured with defaults so that a particular type of data (e.g., proactive polling data) is sent to CTS location 210, while another data type (e.g., reactive SNMP data) is sent to CTS location 212. However, all data could be sent to one CTS, in the event of a failure at one of either CTS location 210 or 212.

Figure 3:
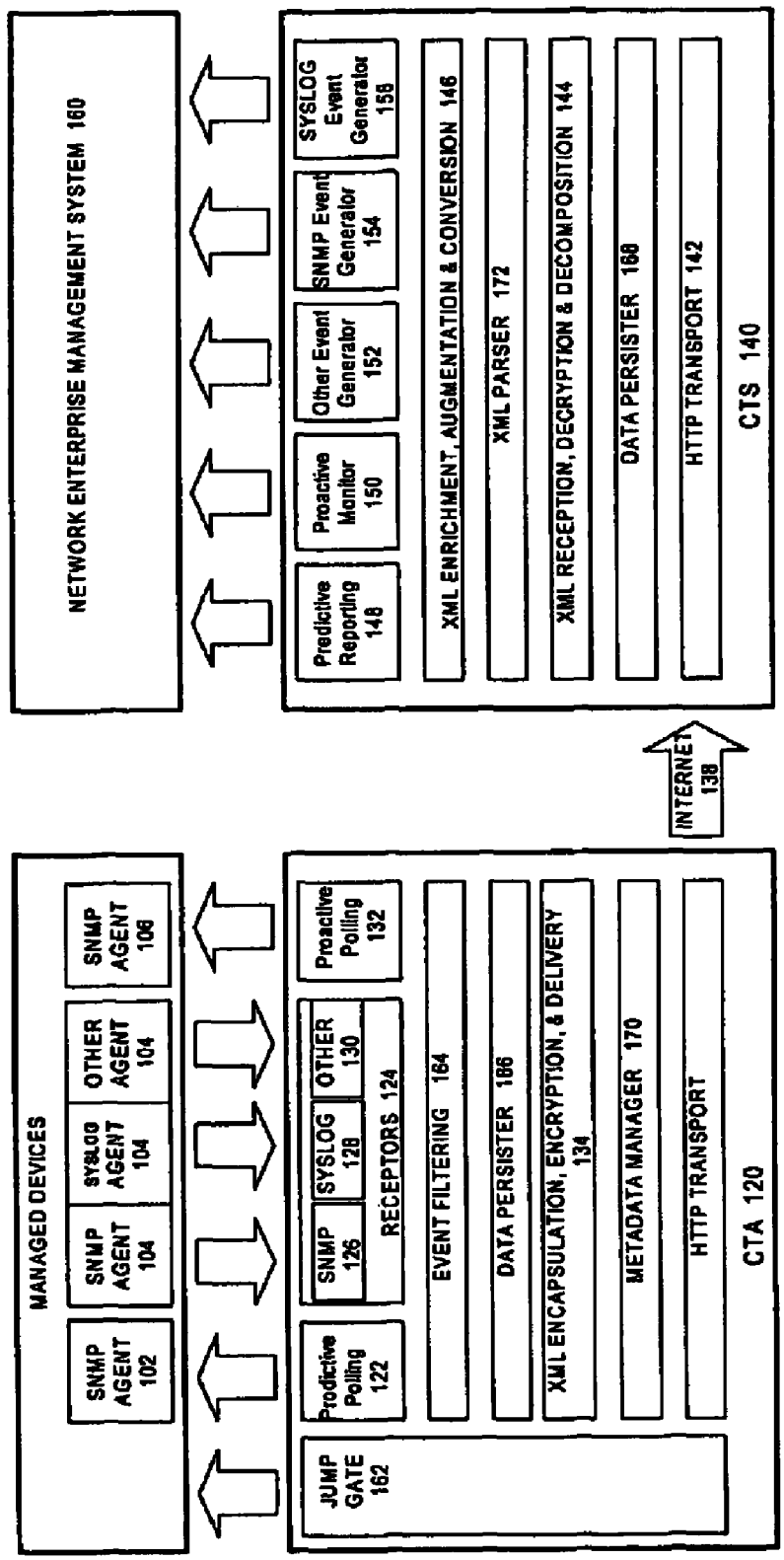
FIG. 3 illustrates the information flow and components in an embodiment of the present invention using a customer jump gate.

FIG. 3 illustrates the information flow and components of an event delivery system using a customer jump gate and other additional modules. Refer to jump gate module 162. A management company may require full management access to customer devices to perform fault remediation and root cause analysis. Management access can provide a number of challenges from both IP connectivity and security fronts. Use of CTA 120 can solve these issues by, e.g., using soft VPN's between metaframe management hosts distributed across the management company's infrastructure directly to the CTA 120. Once connected and authentication has taken place, CTA 120 may provide a jump point to manage customer devices. This approach can, e.g., resolve the need for network address translation to be performed since CTA 120 can, e.g., both have a public Internet address and be connected to, e.g., the customer's locally allocated address space defined by, for example, RFC1918.

In preferred embodiments, CTA 120 supports at least some, preferably all, of the following management protocols: 1 Protocol Use Telnet Basic network equipment (such as, e.g., Cisco) SSH Unix based hosts and encryption aware network devices X Unix hosts requiring X-windows management tools Virtual Network Computing (VNC) Support for VNC including tightlib compression and encryption and Windows and Unix platforms Window Terminal Services (RDP) Windows 2000 HTTP/S Launching web browsers to locally administrate applications (such as, e.g., Netscape admin server) PCAnywhere Support for Windows servers running PCAnywhere protocols Jump gate 162 can be used to unify these access methods to a single host to simplify remote support.

Refer now to event filtering module 164 of FIG. 3. Most devices capable of generating events make no provision to selectively chose events to send other than basic severity level settings. Event filter 164 provides a mechanism to squelch types of events or hosts from delivering information to the CTS 140. In some embodiments, filtered events are defined using XML showing the event schema field to search for and the string to match within the field. These strings may be expressed, e.g., as regular expressions to provide multiple matching (wildcards).

A data persistence layer 166 permits CTA 120 to operate in store-and-forward mode should the Internet connection to the CTS become unavailable. In this mode, the CTA 120 queues events for future delivery to ensure no events are lost in transit. In some embodiments, persister 166 only permits events from being "dequeued" on confirmation of event reception from the CTS 140. Thus, the system may be used to provide reliable delivery of events over potentially unreliable transport (such as, e.g., over the Internet). Each event is acknowledged by the CTS 140 on reception and only at this time are events "dequeued" by the persister. Corresponding to data persister 166, data persister 168 in the CTS 140 performs the same function for information transmissions from the CTS 140 back to the CTA 120.

CTA requires several items of metadata to describe a customer environment and support core operations. This may include, e.g., inventory information, address translation, polling intervals and/or values to be collected by the data collector. Collection and processing of this data is accomplished through metadata manager 170. Preferably, all metadata within the CT is stored in XML format. Among other things, this may provide a high degree of portability and/or easy interaction with CT components. In preferred embodiments, metadata is hosted on the CTS and transferred to the CTA on startup and configuration changes. Among other things, this mode of operation may allow for rapid swap outs of hardware should a failure occur.

In some illustrative embodiments, substantially any management company's support personnel with knowledge of the customer's systems will be able to provision the CTA 120. Preferably, the CTA 120 accomplishes such flexibility by the custom Linux® distribution being preloaded onto each CTA in base configuration. On first boot of the server, a series of questions will preferably drive the addressing, configuration and/or startup of CTA 120. Once deployed to a customer, CTA 120 will immediately make contact with the management company pushing its configuration back for archival. Should the CTA 120 suffer hardware failure, a process will preferably be provided to activate this backed up configuration on a clean box before reshipping. This automated approach minimizes deployment and support activities and leverages customer engineers who have detailed knowledge of a particular deployment.

Finally, FIG. 3 also depicts an XML parsing module 172 in CTS 140. XML parser 172 intercepts inbound messages from CTA and selects the appropriate interpreter to handle the data. This may be accomplished, e.g., by interpreting the XML data type field to select the correct handler to process the event.

Figure 4:
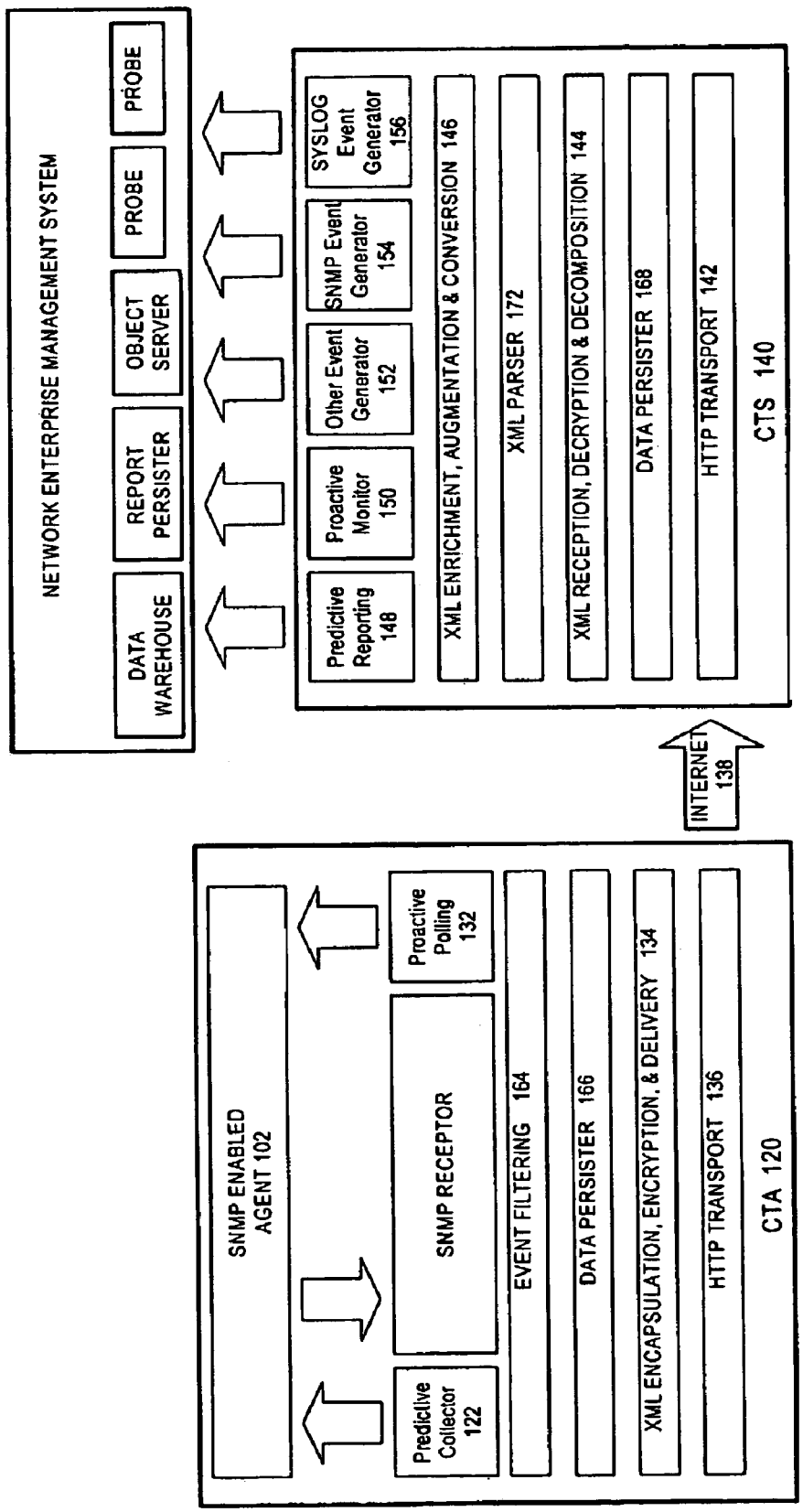
FIG. 4 illustrates the information flow and components in an embodiment of the present invention using a software-only deployment.

FIG. 4 depicts an embodiment of the present invention using a substantially software deployment. In many cases, it is desirable to deploy the monitoring/reporting features of CT without or substantially without the additional cost of deploying a hardware solution. Particularly, for example, if a monitoring and/or management company is performing service on a limited number of hosts, a third party is providing the hands on remediation or is trailing such services.

In some embodiments, re-using the lightweight components of the CTA architecture, it is possible to deploy a minimal interface to allow the monitoring application agent (such a SysEdge™ agent) to fully interoperate with a CTS over the Internet using only push technology. This requires no inbound access to the customer network. Using this mode of operation allows a monitoring and/or management company to leverage its investment in the monitoring application and the effort in building out application specific configuration files to customers who do not warrant the deployment of a server solution.

In this model, the monitoring application may be configured to send event SNMP traps to its loop back address (back to itself without traversing down to the physical layer) where the receptor would process the event and deliver to the CTS. Moreover, the data collector and heartbeat modules may be deployed to provide proactive reporting and proactive monitoring services. In preferred embodiments, the overhead should be minimal and should comfortably run on many web, database and/or application server(s).

Figure 5:
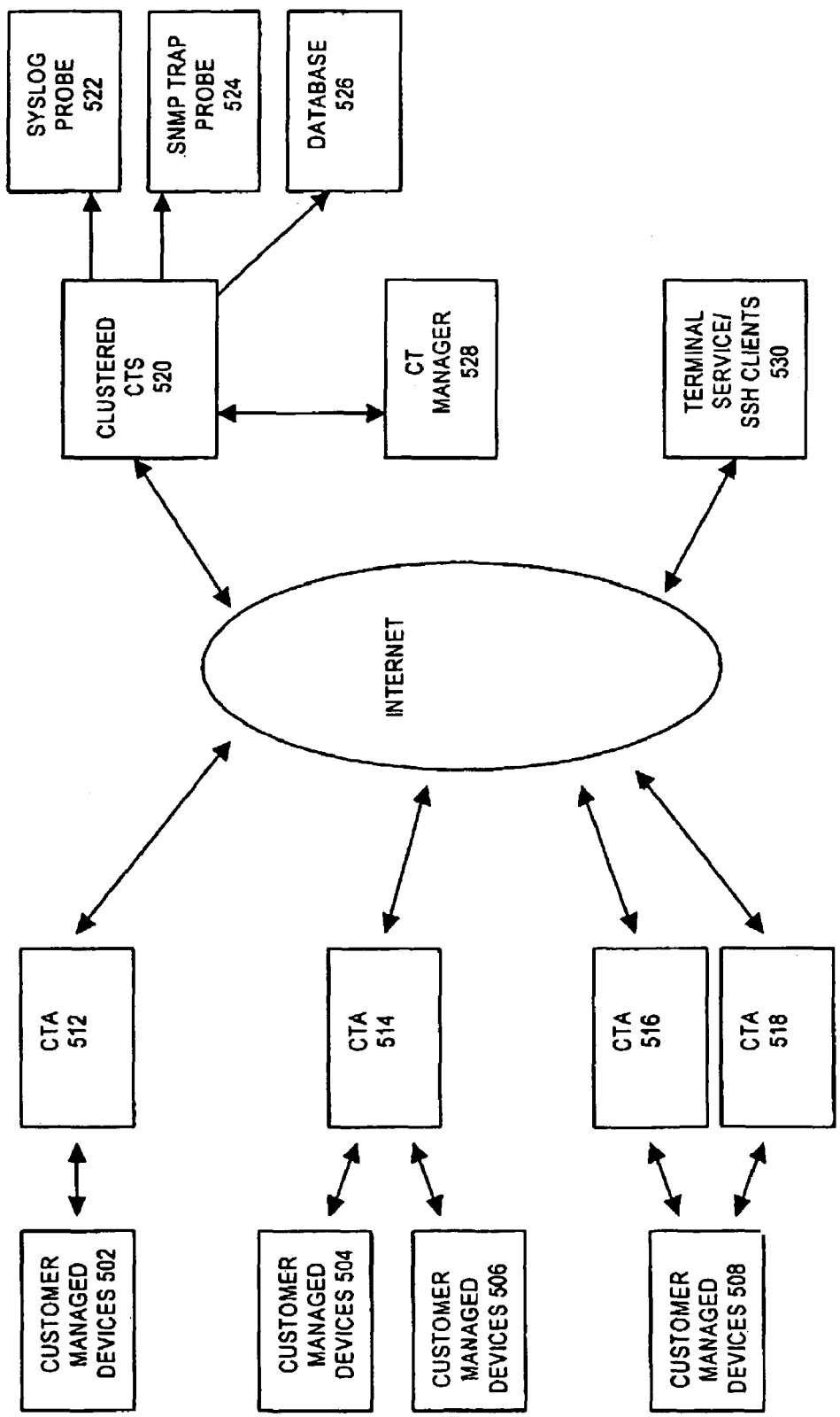
FIG. 5 is an illustrative system view of one embodiment consistent with the present invention.

FIG. 5 provides an illustrative system view of the control tower applied in a multiple client environment. Generally, CTA's may be deployed in one-to-one, one-to-many, or many-to-one configurations depending on customers/partners environment. In FIG. 5, Customer Managed Device (CMD) 502 is connected in a one-to-one relationship with CTA 512. CMD 504 and CMD 506 are connected with CTA 514 in an exemplary one-to-many relationship, so that both customers are able to report events from managed devices to single a CTA. A one-to-many relationship may be useful, for example, for customers with combined number of managed devices below the connection capacity of the CTA hardware to provide hardware cost savings. CMD 508 is connected with CTA in an exemplary many-to-one relationship, so that a single customer provides reporting data to more than one CTA. A many-to-one relationship may be useful, for example, for a customer who has a total number of devices that exceeds the connection capacity of a single CTA.

Still referring to FIG. 5, data transmitted to and from CTA's 512, 514, 516, and 518 may be securely transported via the Internet to a cluster of CTS's 520, including one or more CTS's. A single CTS will preferably support many customers and is easy to scale with additional computing resources. Data from each CMD 502, 504, 506, and 508 may be directed to an appropriate a local probe within a set of enterprise network management tools, such as Syslog probe 522 or SNMP trap probe 524. Customer data may also be routed to a local database connected to CTS cluster 520. Additionally, operations of CTS cluster 520 may be managed by a separate control tower manager 528 that is operatively connected to CTS cluster 520. Rather than to a CTS, data from CTAs 512, 514, 516, and 518 may also be securely transported via the Internet to a thin client architecture 530, such as Terminal Services or SSH clients.

Figure 6:
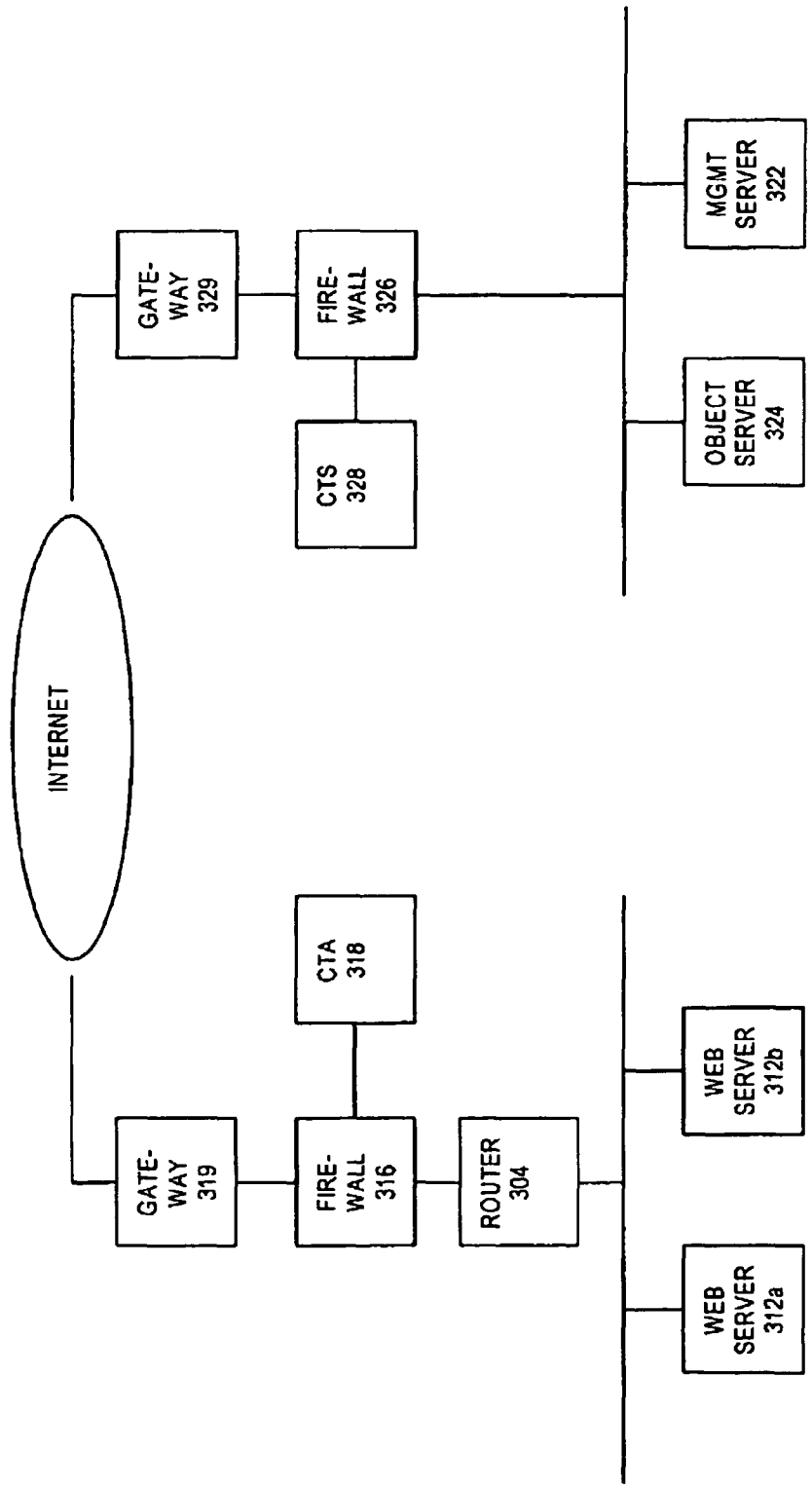
FIG. 6 is an illustrative configuration of one embodiment consistent with the present invention for a single customer.

FIG. 6 is an illustrative configuration for a single customer using one embodiment consistent with the present invention. Event data from a customer web servers 312a and 312b and from router 314 are passed to the customer's CTA 318. Reactive events are typically delivered to CTA 318 in SNMP or Syslog formats. Predictive collection and proactive polling may be delivered from the CTA to a client device via SNMP or ICMP formats. From CTA 318 data is passed over the Internet via a standard outbound HTTP connection through firewall 316 and gateway 319 using XML over HTTP. The data is received at CTS 328 located in a data management center network 320 through gateway 329 and firewall 326. The data is received and reformatted in CTS 328 and provided via TCP database inserts to an object server 324. The data is monitored and analyzed within data management center 320. Information from data management center 320 is provided for access by the client by sending data from Citrix® management server 322 back to CTA 318 via a virtual private network (VPN). Numerous other configurations using combinations of the above protocols, as well as those using different protocols are envisioned within the scope of the present invention.

Figure 7A:
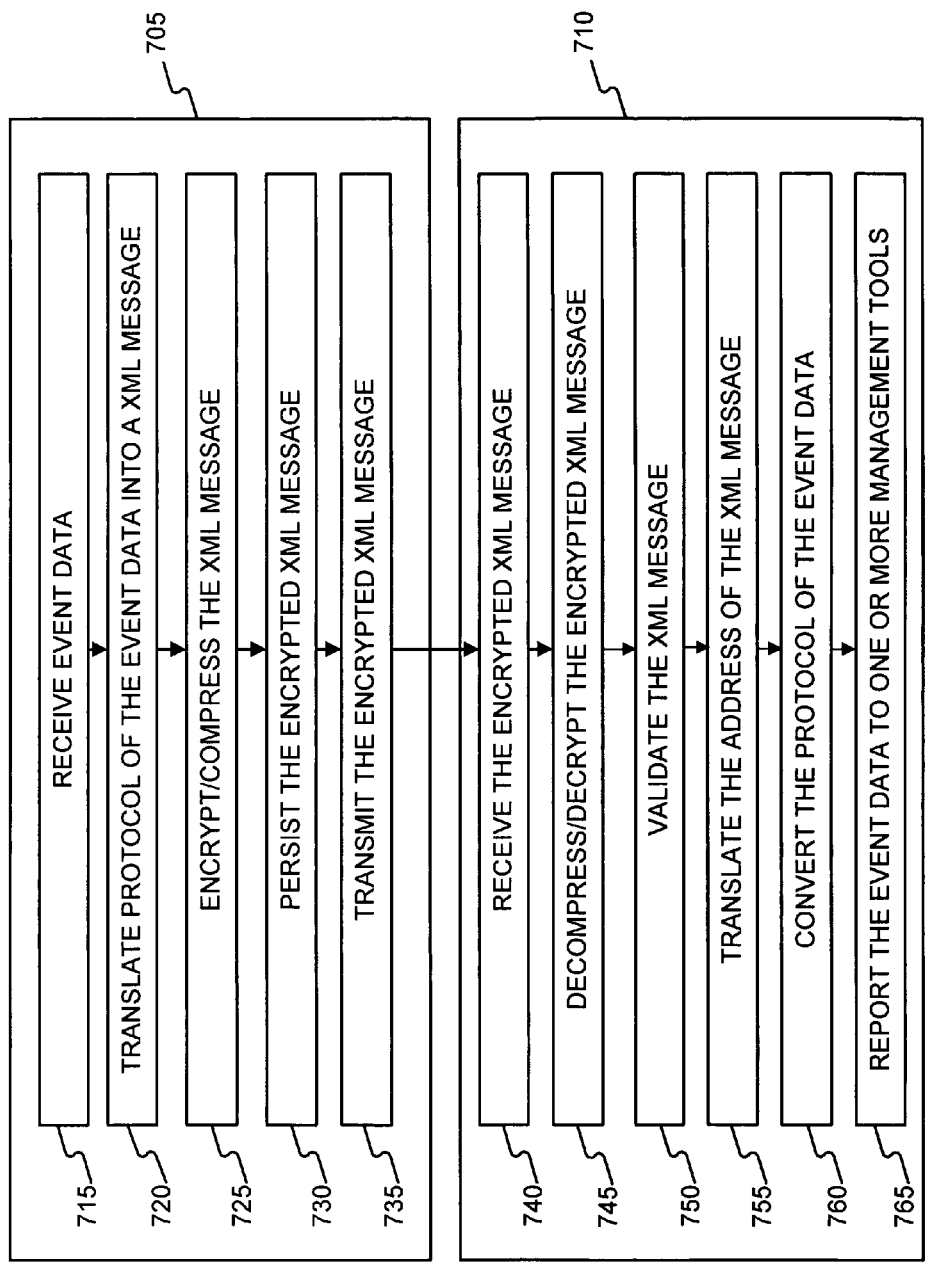
FIG. 7A is a flow diagram of a process for communicating event data in a network, according to an embodiment of the invention.

FIG. 7A is a flow diagram of a process for communicating event data in a network, according to an embodiment of the invention. As shown in FIG. 7A, an appliance process 705 (which may be executed in CTA 120) precedes a server process 710 (which may be executed in CTS 140).

Appliance process 705 begins by receiving event data in step 715. The protocol of the event data may be, for example, a Simple Network Management Protocol (SNMP), system log (SYSLOG), socket, or other native protocol. Then, in step 720, the native protocol for the data received in step 715 is translated into an Extensible Markup Language (XML) format using predefined tags. For instance, where the native protocol for data received in step 715 is SNMP, which has been encoded using Abstract Syntax Notation number One (ASN.1) formatting, translation step 720 may be performed in accordance with Basic Encoding Rules (BER) associated with ASN.1. ASN.1 is an international standard for describing data transmitted by a telecommunications protocol. The XML message created in step 720 includes the event data, a native IP address associated with the device originating the event data, and an identifier associated with the CTA 120 or other appliance that received the event data in step 715.

Step 720 may also include a hash of the XML message using MD-5 or other suitable algorithm.

The XML message created in step 720 may then be encrypted and/or compressed in step 725. In step 730, the encrypted and/or compressed XML message is preferably persisted in preparation for transmission (e.g., from CTA 120 to CTS 140) in step 735. Persisting event data in step 730 improves the ability to maintain a communication session if/when the link between the CTA 120 and the CTS 140 is temporarily unresponsive, for example as may occur where the link between the CTA 120 and the CTS 140 utilizes the Internet.

The encrypted and/or compressed XML message received in step 740 is decompressed and/or decrypted in step 745 to decode the processing of step 725. Next, in step 750, the XML message may be validated, for example, by performing a hash operation using the same hash algorithm used in step 720. The XML message is validated in step 750 if the hash value for the XML message in step 750 matches the hash value for the XML message in step 720. Where validation step 750 fails, the hash could be recomputed and/or an error message can be returned to the CTA 120.

Upon successful validation of the XML message in step 750, the process translates the address of the XML message in step 755. The purpose of address translation in step 755 is to account for the fact that a single network management system may be processing data across multiple local networks having overlapping IP addresses. Step 755 associates a new IP address with the event data for use in the network management system. Advantageously, step 755 operates at the application layer, avoiding modification to standard communication protocols. Significantly, the translation step 755 obviates the need for Network Address Translation (NAT). Step 755 is further described with reference to FIG. 7B.

In step 760, the process converts the protocol of the event data back to a native format. For example, the XML message may be translated from XML format to SNMP, or to another native protocol, to simulate the event data received in step 715. Finally, in step 765, the event data is reported to one or more management tools.

Figure 7B:
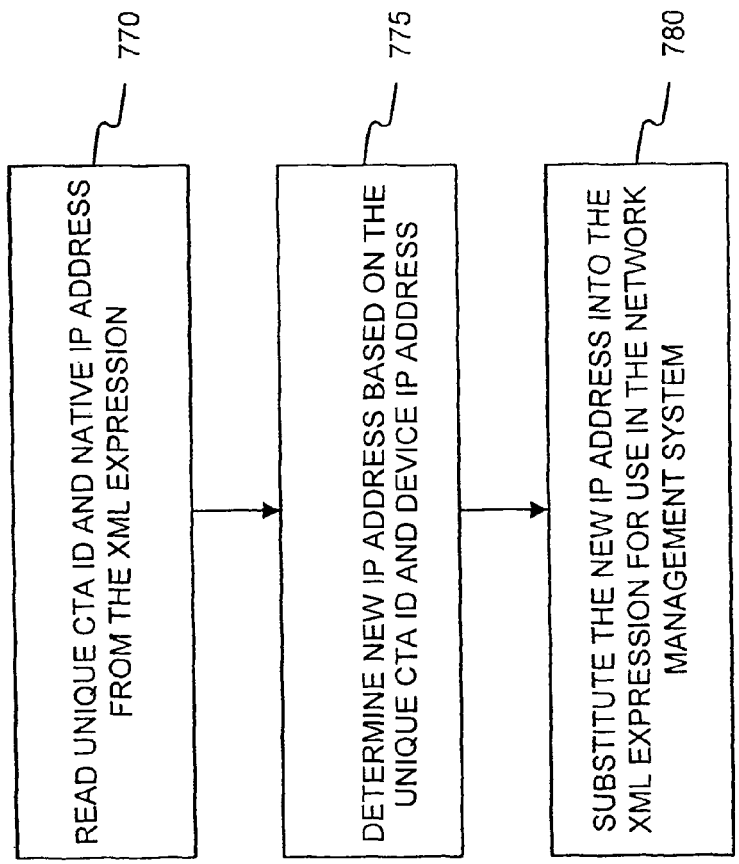
FIG. 7B is a flow diagram of an address translation process, according to an embodiment of the invention.

FIG. 7B is a flow diagram of an address translation process, according to an embodiment of the invention. FIG. 7B is an embodiment of translation step 755.

As shown in FIG. 7B, the process begins in step 770 by reading the unique CTA identifier and the native IP address from the XML expression. A native IP address is the IP address for a device that is associated with the event data. It should be appreciated that the CTA identifier and the native IP address form a unique combination. For example, with reference to FIG. 5, a CTA identifier associated with CTA 514 distinguishes over networks associated with CTA 512, CTA 516, and CTA 518. Moreover, within the customer network serviced by CTA 514, the native IP address associated with managed device 504 will be distinct from the native IP address associated with managed device 506. Thus, although managed devices 504 and 502 may have the same native IP address (for example where CTA 504 and CTA 502 service the networks of two separate customers), there is only one managed device associated with CTA 514 having the native IP address associated with managed device 504.

Next, in step 775, the process determines a new IP address based on the unique CTA identifier and native IP address. In executing step 775, the process may consult a pre-defined table that associates the new IP address with each CTA identifier and native IP address pair. Finally, in step 780, the process substitutes the new IP address into the XML expression, replacing the native IP address, for later use in the network management system 160.

Unlike the native IP addresses, the new IP addresses determined in step 775 and substituted into the XML expression in step 780 cannot overlap.

Figure 8:
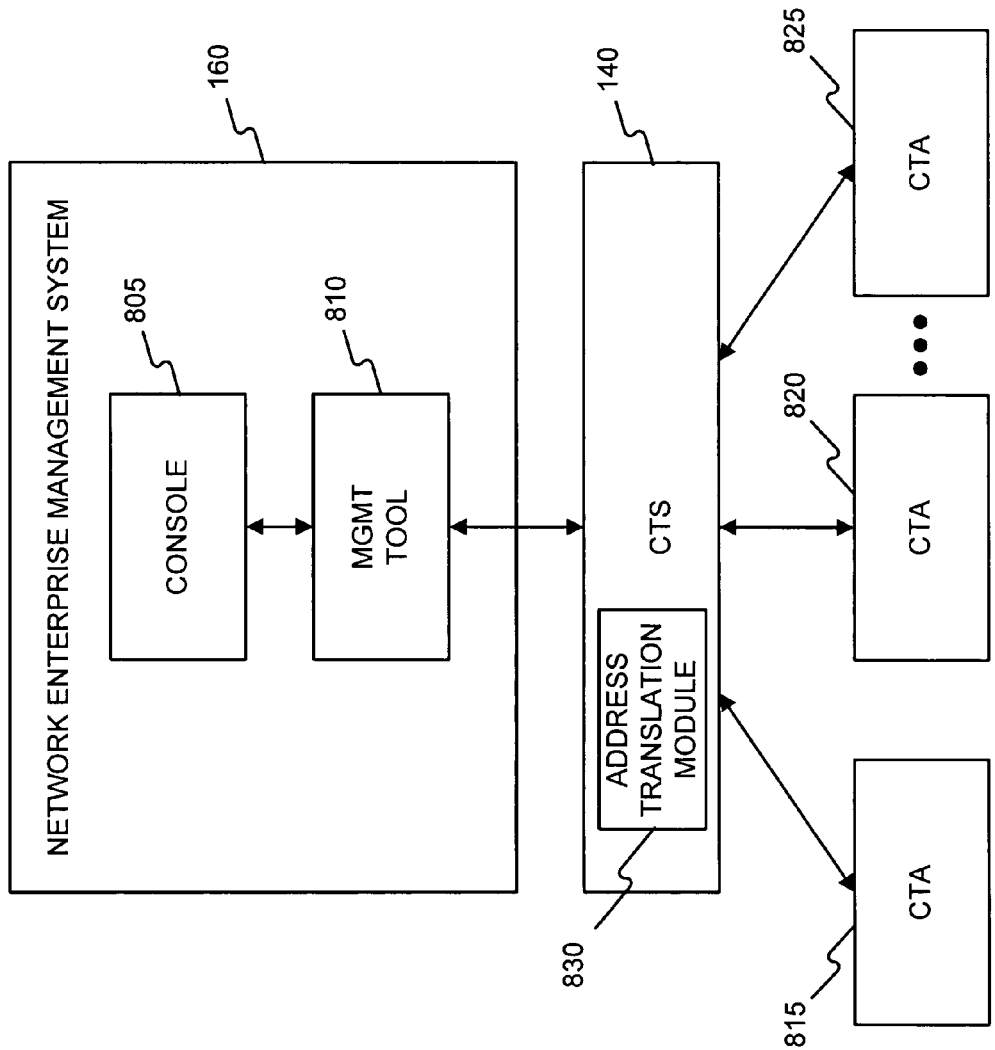
FIG. 8 is a schematic diagram of a functional architecture for a network management system, according to an embodiment of the invention.

FIG. 8 is a schematic diagram of a functional architecture for a network management system, according to an embodiment of the invention. As shown in FIG. 8, CTA's 815, 820, and 825 are coupled to a CTS 140. In turn, the CTS 140 is coupled to a network enterprise management system 160.

Each of the CIA's 815, 820, and 825 may be configured to perform the appliance process 705 described above. The CTS 140 may be configured to perform the server process 710 described above. In the illustrated embodiment, the CTS 140 includes an address translation module 830, which may be configured to perform the translation step 755 described above with reference to FIGS. 7A and 7B.

The network enterprise management system 140 preferably includes a console 805 coupled to a management tool 810. The management tool 810 may perform analysis of received event data, and an administrator may use the console 805 to review the received event data and/or to exercise features of the management tool 810.

In sum, FIG. 8 illustrates how a CTS 140 enables a single management tool 810 to be leveraged across multiple customer networks (not shown) serviced by CTA's 815, 820, and 825.

Figure 9:
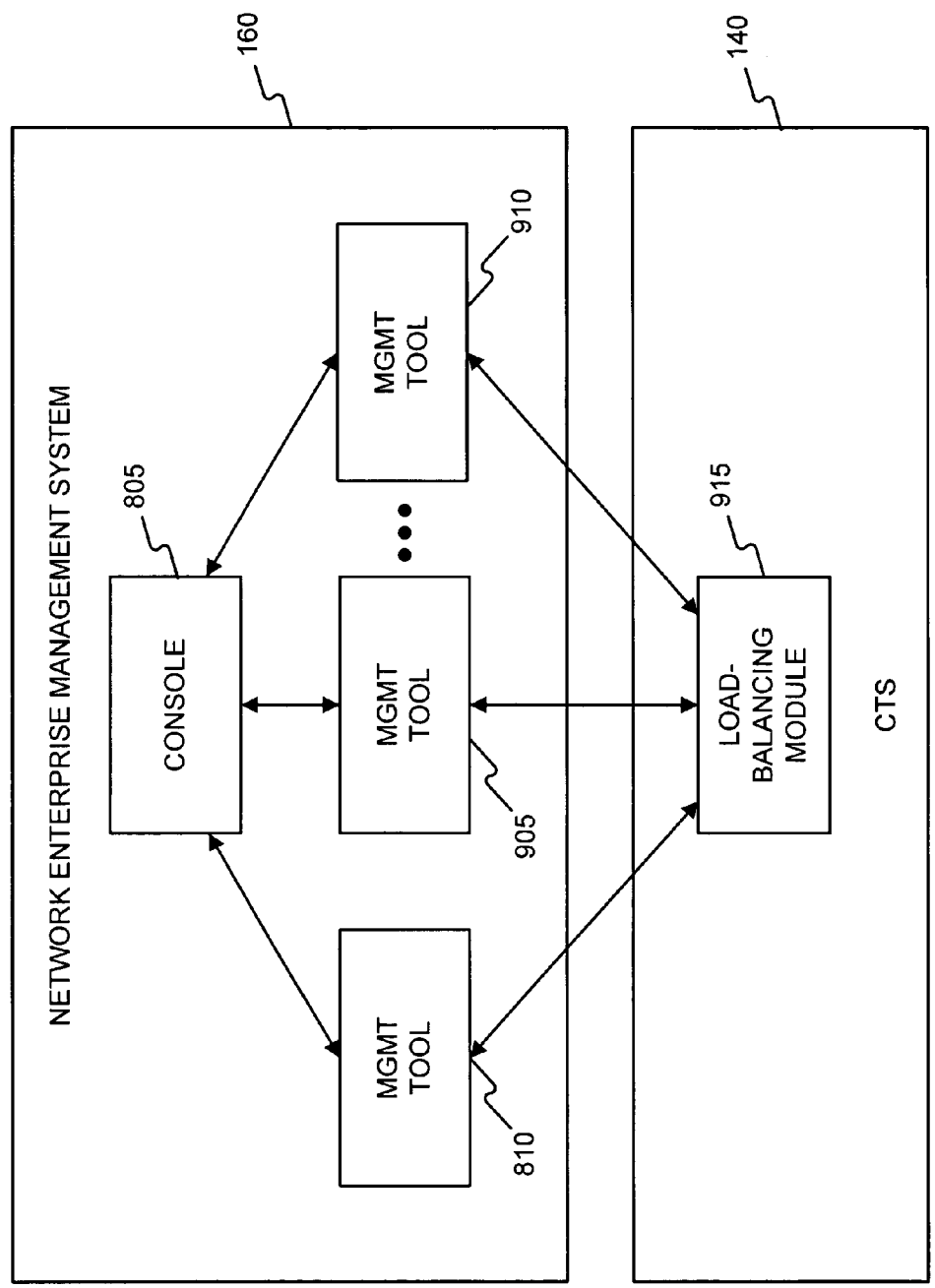
FIG. 9 is a schematic diagram of a functional architecture for a network management system, according to an embodiment of the invention.

FIG. 9 is a schematic diagram of a functional architecture for a network management system, according to an embodiment of the invention. In the embodiment illustrated in FIG. 9, the network management system 160 includes management tools 810, 905, and 910, coupled to the console 805. In addition, the CTS 140 includes a load-balancing module 915. The load-balancing module 915 is coupled to each of the management tools 810, 905, and 910. The purpose of the load-balancing module 915 is to balance event data received in CTS 140 and delivered to network enterprise management system 160.

Load-balancing module 915 may be configured to execute one or more algorithms. For instance, load-balancing module 915 may be configured to operate in accordance with predetermined assignments that associate one or managed devices (not shown) with one of the management tools 810, 905, and 910. Such predetermined assignments may be based on the new IP address or other criteria. For example, load-balancing module 915 may direct event data originating from all managed devices (not shown) at a particular client facility (not shown) to one of the management tools 810, 905, and 910.

Embodiments of load-balancing module 915 that are configured to use predetermined assignments may have at least two advantages. First, the application of predetermined assignments may distribute received event data approximately uniformly amongst management tools 810, 905, and 910, limiting the probability that any one of the management tools 810, 905 and 910 will become overburdened. Second, unlike round-robin schemes, the application of predetermined assignments may facilitate data correlation. For example, it may be appropriate to send all event data associated with a certain type of managed device to the same management tool.

In the alternative, or in combination with the foregoing algorithm, the load-balancing module 915 may be configured to implement a fault-tolerance algorithm. In operation, the fault-tolerance algorithm monitors the operational status of each of the management tools 810, 905, and 910. In the event that one or more of the management tools 810, 905, and 910 is nonfunctional, the load-balancing module 915 may reassign event data traffic to a functional management tool.

In the alternative, or combination with one or more of the above algorithms, the load-balancing module 915 may be configured to transmit event data from one or more devices to more than one subscriber. For example, where each of the management tools 810, 905, and 910 represent unique subscribers, event data from a particular device (not shown) may be directed to both management tool 810 and management tool 905. Multiple subscriptions might be advantageous, for example, where each of the management tools 810, 905, and 910 are configured to perform unique analysis functions.

Features of the architectures illustrated in FIGS. 8 and 9, and described above, may be used in any combination, according to design choice.

FIG. 10 is a flow diagram of a process for communicating event data in a network, according to an embodiment of the invention. The load-balancing module 915 may be configured to implement the process illustrated in FIG. 10 and described below.

As shown in FIG. 10, the process begins by monitoring the individual status of multiple management tools in step 1005. The status may be, for example, either functional or nonfunctional. Next, in step 1010, the process receives event data, for instance in the CTS 140. In step 1015, the process determines a default management tool assignment. Step 1015 may be performed using a look-up table of predefined management tool assignments. For example, all event data in a predetermined new IP address range associated with a particular customer's network may be assigned to the same network management tool for analysis.

Then, in conditional step 1020, the process determines whether the default management tool is functional. Where the result of conditional step 1020 is in the affirmative, the process advances to step 1025 to forward the event data to the default management tool; where the result of conditional step 1020 is in the negative, the process advances to step 1030 to determine an alternate management tool assignment.

Next, in conditional step 1035, the process determines whether the alternate management tool is functional. Where the result of conditional step 1035 is in the affirmative, the process advances to step 1040 to forward the event data to the alternate management tool; where the result of conditional step 1035 is in the negative, the process terminates in step 1045.

Variations to the illustrated process are possible. For instance, instead of functional status, steps 1005, 1020, and 1035 may operate on other qualitative or quantitative measures. In addition, in other embodiments, where the event data is not sent to the default management tool, more than one alternative management tool may be tried.

The embodiments of the invention described above may be used separately or in any combination, according to design choice. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for communicating event data in a network, comprising:
   receiving the event data in a first device, the event data including a native IP address associated with a source of the event data;
   translating a native protocol of the event data into XML, a resulting XML message including the event data and a unique identifier associated with the first device;
   transmitting the XML message from the first device to a second device;
   determining a new IP address based on the native IP address and the unique identifier, wherein the determining of the new IP address is performed by an address translation module without use of Network Address Translation (NAT);
   substituting the new IP address into the XML message in replacement of the native IP address; and
   reporting the XML message having the substituted new IP address to at least one management tool, wherein the substituted new IP address in the XML message is used to identify the source of the event data.

2. The method of claim 1 wherein the native protocol is SNMP, and the translating the native protocol is based on Basic Encoding Rules (BER) associated with Abstract Syntax Notation number One (ASN.1) standard.

3. The method of claim 1 wherein the native protocol is in system log (SYSLOG) format.

4. The method of claim 1, further comprising, prior to transmitting the XML message, persisting the XML message based on a status of a communication link between the first location and the second location.

5. The method of claim 1, wherein the reporting is based at least in part on the operational status of at least one of the at least one management tool.

6. The method of claim 1, wherein the reporting is based at least in part on a predetermined assignment, the predetermined assignment providing an association between the event data and at least one of the at least one management tool.

7. The method of claim 6, wherein the predetermined assignment based on the new IP address.

8. The method of claim 1, further comprising, after the including the new IP address, and before the reporting, converting the protocol of the event data from XML to a native format.

9. The method of claim 1, further comprising, after the translating the native protocol and before the transmitting, hashing the XML message.

10. The method of claim 9, further comprising, after the hashing, at least one of encrypting the XML message and compressing the XML message.

11. The method of claim 1, further comprising, after the translating the native protocol and before the transmitting, at least one of encrypting the XML message and compressing the XML message.

12. A method, comprising:
   receiving event data in a first server, the event data including a native IP address associated with a source of the event data;
   translating a native protocol of the event data into XML, a resulting XML message including the event data and a unique identifier associated with the first server;
   transmitting the XML message from the first server to a second server;
   determining, with an address translation module running on the second server, a new IP address based on the native IP address associated with the source of the event data and the unique identifier for the first server, wherein the source of the event data is a device that differs from the first server;
   substituting the new IP address into the XML message in replacement of the native IP address; and
   reporting, with the second server, the XML message having the substituted new IP address to at least one management tool.

13. The method in claim 12, the method further comprising, after the substituting the new IP address, and before the reporting, converting the protocol of the event data from XML to a native format.

14. A system for communicating event data in a network, comprising:
   a network management system;
   a management server; and
   a customer appliance coupled to the management server, wherein the customer appliance
   a) receives the event data from at least one managed device, the event data including a native IP address associated with the at least one managed device and differing from the customer appliance; b) translates a native protocol of the event data into XML, a resulting XML message including the event data and a unique identifier associated with the customer appliance; and c) transmits the resulting XML message to the management server;
   wherein:
   the management server is coupled to at least the customer appliance and the management system, and includes an address translation module that a) determines, without use of Network Address Translation (NAT), a new IP address based on the native IP address and the unique identifier and b) substitutes the new IP address into the XML message in replacement of the native IP address.

15. The system of claim 14, wherein the network management system includes:
   at least one management tool;
   and a console coupled to the at least one management tool.

16. The system of claim 14, wherein the network management system includes a plurality of management tools, and wherein the management server includes a load balancing module configured to balance the distribution of the event data between each of the plurality of management tools.

17. The method of claim 1, further comprising:
   determining a status for each of a plurality of management tools, the status being one of functional and non-functional;

receiving event data from a management network; wherein the event data includes the new IP address;

selecting a management tool from a plurality of management tools based on a predetermined assignment, wherein the predetermined assignment is based on the new IP address; and if the status of the selected management tool is functional, forwarding the event data to the selected management tool.

18. The method of claim 17 further comprising, if the status of the selected management tool is non-functional, selecting an alternative management tool.

19. A method, comprising:

receiving event data in a first device, the event data including a native IP address associated with a source of the event data;

translating a native protocol of the event data into XML, a resulting XML message including the event data and a unique identifier associated with the device;

transmitting the XML message from the first device to a second device;

determining, with an address translation module run by the second device, a new IP address based on the native IP address and the unique identifier, and substituting the new IP address into the XML message in replacement of the native IP address;

determining a status for each of a plurality of management tools, the status being one of functional and non-functional;

receiving the event data from a managed network, wherein the event data includes the new IP address; and selecting a management tool from a plurality of management tools based on a predetermined assignment, wherein the predetermined assignment is based on the new IP address; wherein if the status of the selected management tool is functional, forwarding the event data to the selected management tool; and if the status of the selected management tool is non-functional, selecting an alternative management tool.

* * * * *